United States Patent [19]

Shiromaru et al.

[11] Patent Number: 5,489,672
[45] Date of Patent: Feb. 6, 1996

[54] PROCESS FOR THE PRODUCTION OF DIS-AZO PIGMENT WHOSE AMINE CONTENT IS SMALL, AND PIGMENT PRODUCED BY SAID PROCESS

[75] Inventors: Osamu Shiromaru; Hitoshi Sugamo, both of Tokyo, Japan

[73] Assignee: Toyo Ink Manufacturing Co., Ltd., Tokyo, Japan

[21] Appl. No.: 329,234

[22] Filed: Oct. 26, 1994

[30] Foreign Application Priority Data

Oct. 29, 1993 [JP] Japan .................... 5-271373

[51] Int. Cl.⁶ .................... C09B 35/035; C09B 67/54
[52] U.S. Cl. .................... 534/747; 534/575; 534/887; 106/496
[58] Field of Search ............... 534/575, 747, 534/887; 106/496

[56] References Cited

U.S. PATENT DOCUMENTS

| | | | |
|---|---|---|---|
| 4,124,582 | 11/1978 | Ribka et al. | 534/747 |
| 4,643,770 | 2/1987 | Hays | 534/747 |
| 4,720,541 | 1/1988 | Rieper et al. | 534/747 X |

FOREIGN PATENT DOCUMENTS

| | | |
|---|---|---|
| 2214734 | 8/1974 | France . |
| 1456332 | 11/1976 | United Kingdom . |

OTHER PUBLICATIONS

Jomaru et al., Chemical Abstracts, vol. 119, No. 4, 26 Jul. 1993, Abstract No. 29975h, p. 101 JP-A-05065426.

*Primary Examiner*—Johann Richter
*Assistant Examiner*—Fiona T. Powers
*Attorney, Agent, or Firm*—Wenderoth, Lind & Ponack

[57] ABSTRACT

A process for the production of a dis-azo pigment which is excellent in sanitary condition and almost free of a residual coupler component and decomposition products derived from the residual coupler component, and has a reduced aromatic amine content, and a dis-azo pigment produced by the said process, the process comprising the steps of (a) coupling-reacting a solution of a tetrazonium salt of benzidine with a slurry of acetoacetanilide of which the amount is stoichiometrically excess relative to an amount of said tetrazonium salt, to prepare a dis-azo pigment slurry, and (b) adding a halogen to the dis-azo pigment slurry to treat the acetoacetanilide in said slurry.

6 Claims, No Drawings

PROCESS FOR THE PRODUCTION OF DIS-AZO PIGMENT WHOSE AMINE CONTENT IS SMALL, AND PIGMENT PRODUCED BY SAID PROCESS

FIELD OF THE INVENTION

The present invention relates to a process for the production of a dis-azo pigment excellent in sanitary condition and a dis-azo pigment produced by said process.

PRIOR ART OF THE INVENTION

A dis-azo pigment is produced by a coupling reaction of a solution of a tetrazonium salt of benzidine (including benzidine derivative) and a coupler solution of acetoacetanilide (including acetoacetanilide derivatives). The tetrazonium salt of benzidine (to be sometimes referred to as "tetrazo component" hereinafter) is chemically unstable and easily undergoes decomposition or condensation, and the tetrazonium salt consequently deteriorates the quality of the dis-azo pigment as a coloring material. For preventing the formation of a free tetrazo component, generally, the coupling reaction is carried out in the presence of the coupler in an amount which is stoichiomctrically excessive to some extent. As a result, the pigment contains a residual coupler. The residual coupler is partly decomposed to form aromatic amines when a pigment slurry is heat-treated or when a pigment cake is dried. It is considered that, when the pigment is used as coloring material, the residual coupler and the aromatic amines are undesirable in view of sanitation.

For reducing the residual coupler, generally, an alkali is added to the pigment slurry to dissolve acetoacetanilides in the coupler solution, and an excess coupler is removed together with a filtrate when the pigment is filtered. However, excess acetoacetanilides tend to be absorbed and stored in pigment particles, and it has been difficult to remove this residual coupler.

Therefore, there are worldwide increasing demands for dis-azo pigments free of aromatic amines, while dis-azo pigments commercially available now are not necessarily satisfactory. For example, many products available as C.I. Pigment Yellow 83 have a 2,5-dimethoxy-4-chloroaniline content of 300 to 1,000 ppm, and in fact, some products have a 2,5-dimethoxy-4-chloroaniline content of more than 5,000 ppm.

Further, as described above, the tetrazo component and the coupler component are allowed to react in stoichiometrically nearly equal amounts, there is obtained a dis-azo pigment containing almost no residual aromatic amine. However, there has been a problem in that a decomposition product derived from the tetrazo component makes the pigment hue cloudy to decrease the pigment product quality greatly.

SUMMARY OF THE INVENTION

It is an object of the present invention to provide a process for the production of a dis-azo pigment excellent in sanitary condition, and a dis-azo pigment produced by said process.

It is another object of the present invention to provide a process for the production of a dis-azo pigment almost free of a residual coupler component and decomposition products derived from the residual coupler component, and a dis-azo pigment produced by said process.

It is further another object of the present invention to provide a process for the production of a dis-azo pigment whose aromatic amine content is small, and a dis-azo pigment produced by the said process.

Other objects and advantages of the present invention will be apparent from the following description.

According to the present invention, the above objects and advantages of the present invention are achieved by a process for the production of a dis-azo pigment whose aromatic amine content is small, comprising the steps of (a) coupling-reacting a slurry of a tetrazonium salt of benzidine with a solution of acetoacetanilide of which the amount is stoichiometrically excess relative to an amount of said tetrazonium salt, to prepare a dis-azo pigment slurry, and (b) adding a halogen to the dis-azo pigment slurry to treat the acetoacetanilide in said slurry.

DETAILED DESCRIPTION OF THE INVENTION

In the step (a) of the present invention, the tetrazo component (tetrazonium salt of benzidine) is coupled with a coupler component selected from acetoacetanilides to prepare a dis-azo pigment slurry. The tetrazonium salt of benzidine includes 3,3'-dichlorobenzidine and 2,2',5,5'-tetrachlorobenzidine. Specific examples of the acetoacetanilides include acetoacetanilide, acetoaceto-o-toluidide, acetoaceto-m-xylidide, acetoaceto-o-anisidide, acetoaceto-2,5-dimethoxyanilide, acetoaceto-p-anisidide, acetoaceto-2,5-dimethoxy-4-chloroanilide and acetoaceto-o-chloroanilide. The coupling can be carried out by any known method. Preferably, the amount of the coupler component is stoichiometrically greater than the amount of the tetrazo component by up to 15 mol %, preferably by 5 mol % to 10 mol %. The reason for the use of the coupler component in an excess amount relative to the tetrazo component is that, as the coupling proceeds, the formed pigment covers coupler component particles to decrease the solubility of the coupler component.

In the step (b) of the present invention, a halogen is added to the above-prepared dis-azo pigment slurry. The halogen includes chlorine, bromine and iodine. The halogen is added as follows. When the halogen is in a liquid state, it is dropwise added to the pigment slurry, and when the halogen is in a gaseous state, it (in the form of a gas) is introduced into the pigment slurry. The amount of the halogen based on the pigment is 0.1 to 20% by weight, preferably 1 to 10% by weight. When the amount of the halogen is less than 0.1%, the effect on decreasing an aromatic amine is low. When the amount of the halogen is more than 20% by weight, the quality of the pigment as a product is low. The acetoacetanilide is treated by heating the mixture of the pigment slurry with the halogen at a temperature of 25 to 100° C., preferably 30 to 90° C. for 30 to 120 minutes.

The pigment slurry treated with the halogen is filtered, washed with water and dried according to a conventional pigment production method, to obtain an end product (dis-azo pigment).

In the present invention, the contents of the residual coupler component and aromatic amines can be greatly decreased by treating the pigment slurry with a halogen. Further, the present invention uses an excess of the coupler component for a reaction with the tetrazo component, and the dis-azo pigment obtained according to the present invention consequently has a product quality equivalent to those of conventional pigments. Therefore, the present invention can overcome both the problem in a product quality as a coloring material and the problem in sanitary condition.

The present invention will be explained more in detail hereinafter with reference to Examples, in which "part" and "%" stand for "part by weight" and "% by weight", respectively.

Example 1

30 Parts of 35% hydrochloric acid and 25.3 parts of 3,3'-dichlorobenzidine were added to 600 parts of ice water, and then 13.8 parts of sodium nitrite was added to prepare a solution of a tetrazonium salt. Separately, 17 parts of sodium hydroxide and 57.0 parts of acetoaceto-2,5-dimethoxy-4-chloroanilide were added to 300 parts of water to prepare an alkali solution of the coupler (30° C.). 22 Parts of 80% acetic acid was added to 600 parts of water, and then the above alkali solution of the coupler was added dropwise to separate the coupler as a slurry of reprecipitation. The above solution of the tetrazonium salt was introduced into the the slurry of the coupler to prepare a pigment slurry. Then, 5 parts of bromine was added to the pigment slurry, and the mixture was heated up to 70° C. and allowed to stand for 60 minutes. Then, the slurry was filtered, washed with water and dried to give a dis-azo pigment.

Example 2

8 Parts of iodine was added to the same pigment slurry as that obtained in Example 1, and the mixture was heated up to 90° C. and allowed to stand for 30 minutes. The mixture was filtered, washed with water and dried to give a dis-azo pigment.

Example 3

2 Parts of chlorine gas was blown into the same pigment slurry as that obtained in Example 1, and the mixture was heated up to 30° C. and allowed to stand for 90 minutes. The mixture was filtered, washed with water and dried to give a dis-azo pigment.

Comparative Example 1

Sodium hydroxide was added to the same pigment slurry as that obtained in Example 1. Then, the pigment slurry was heated up to 70° C. Without adding any iodine, and allowed to stand for 60 minutes. The slurry was filtered, washed with water and dried to give a pigment.

Each of the pigments obtained in the above Examples was separately extracted with tetrahydrofuran, and acetoaceto-2,5-dimethoxy-4-chloroanilide and 2,5-dimethoxy-4-chloroaniline contained in the tetrahydrofuran extract were separated and quantitatively determined by high-performance liquid chromatography to determined their contents. The measurement conditions were as follows; An octadecylsilane-based filler was used, a methanol/water (1:1) mixture was used as an eluant, and the detecting wavelength was 235 nm.

Table 1 shows the results.

Example 4

25.3 Parts of 3,3'-dichlorobenzidine was tetrazotized in the same manner as in Example 1 to prepare a solution of a tetrazonium salt. Then, a coupler as a slurry was prepared in the same manner as in Example 1 except that 57.0 parts of acetoaceto-2,5-dimethoxy-4-chloroanilide was replaced with 42.2 parts of acetoaceto-m-xylidide, and the above solution of the tetrazonium salt was introduced into the slurry of the coupler to prepare a pigment slurry. Then, 1 part of bromine was added to the pigment slurry, and the mixture was heated up to 60° C. and allowed to stand for 60 minutes. Then, the slurry was filtered, washed with water and dried to give a dis-azo pigment.

Comparative Example 2

The same pigment slurry as that prepared in Example 4 was heated up to 60° C. without adding any bromine, and allowed to stand for 60 minutes. The slurry was filtered, washed with water and dried to give a pigment.

The contents of acetoaceto-m-xylidide and m-xylidide contained in each of the pigments obtained in Example 4 and Comparative Example 2 were measured by high-performance liquid chromatography in the same manner as in Example 1. Table 1 shows the results.

Example 5

25.3 Parts of 3,3'-dichlorobenzidine was tetrazotized in the same manner as in Example 1 to prepare a solution of a tetrazonium salt. Then, a coupler as a slurry prepared in the same manner-as in Example 1 except that 57.0 parts of acetoaceto-2,5-dimethoxy-4-chloroanilide was replaced with 39.3 parts of acetoaceto-o-toluidide, and the above solution of the tetrazonium salt was introduced into the slurry of the coupler to prepare a pigment slurry. Then, sodium hydroxide was added to the pigment slurry to adjust the slurry to a pH of 10. 3 Parts of iodide was added to the pigment slurry, and the mixture was heated up to 90° C. and allowed to stand for 30 minutes. Then, the slurry was filtered, washed with water and dried to give a dis-azo pigment.

Comparative Example 3

The same pigment slurry as that prepared in Example 5 was heated up to 90° C., and allowed to stand for minutes. The slurry was filtered, washed with water and dried to give a pigment.

The contents of acetoaceto-o-toluidide and o-toluidine contained in each of the pigments obtained in Example 5 and Comparative Example 3 were measured by high-performance liquid chromatography in the same manner as in Example 1. Table 1 shows the results.

TABLE 1

| Ex. & C Ex. | Residual coupler & its content | | Aromatic amine & its content | |
|---|---|---|---|---|
| Ex. 1 | Acetoaceto-2,5-dimethoxy-4-chloroanilide | 260 ppm | 2,5-dimethoxy-4-chloroaniline | 91 ppm |

TABLE 1-continued

| Ex. & C Ex. | Residual coupler & its content | | Aromatic amine & its content | |
| --- | --- | --- | --- | --- |
| Ex. 2 | Acetoaceto-2,5-dimethoxy-4-chloroanilide | 280 ppm | 2,5-dimethoxy-4-chloroaniline | 95 ppm |
| Ex. 3 | Acetoaceto-2,5-dimethoxy-4-chloroanilide | 250 ppm | 2,5-dimethoxy-4-chloroaniline | 83 ppm |
| C Ex. 1 | Acetoaceto-2,5-dimethoxy-4-chloroanilide | 9,700 ppm | 2,5-dimethoxy-4-chloroaniline | 718 ppm |
| Ex. 4 | Acetoaceto-m-xylidide | 57 ppm | m-xylidine | less than 5 ppm |
| C EX. 2 | Acetoaceto-m-xylidide | 2,700 ppm | m-xylidine | 120 ppm |
| Ex. 5 | Acetoaceto-o-toluidide | 23 ppm | o-toluidine | less than 5 ppm |
| C Ex. 3 | Acetoaceto-o-toluidide | 930 ppm | o-toluidine | 100 ppm |

Ex. = Example, C Ex. = Comparative Example

What is claimed is:

1. A process for the production of a dis-azo pigment whose aromatic amine content is small, comprising the steps of
   (a) coupling-reacting a solution of a tetrazonium salt of benzidine with a slurry of acetoacetanilide of which the amount is stoichiometrically excess relative to an amount of said tetrazonium salt, to prepare a dis-azo pigment slurry, and
   (b) adding a halogen to the dis-azo pigment slurry to treat the acetoacetanilide in said slurry.

2. A process according to claim 1, wherein acetoacetanilide is used in an amount which is stoichiometrically greater than an amount of the tetrazonium salt by up to 15 mol %.

3. A process according to claim 1, wherein the halogen is added in an amount of 0.1 to 20% by weight of the pigment slurry.

4. A process according to claim 1, wherein the pigment slurry is heated up to, and maintained at, a temperature between 25 and 100° C. after the halogen is added.

5. A process according to claim 1, wherein a dis-azo pigment whose aromatic amine content is 100 ppm or less is produced.

6. A dis-azo pigment whose aromatic amine content is 100 ppm or less and which is produced by the process as recited in claim 1.

* * * * *